United States Patent [19]

Borer et al.

[11] 4,220,843
[45] Sep. 2, 1980

[54] PROCESS FOR MELTING MATERIAL

[75] Inventors: Werner J. Borer, Flurlingen; Volker Nobbe, Neuhausen am Rheinfall; Hugo Spalinger, Schaffhausen, all of Switzerland

[73] Assignee: Swiss Aluminium Ltd., Chippis, Switzerland

[21] Appl. No.: 946,415

[22] Filed: Sep. 27, 1978

Related U.S. Application Data

[62] Division of Ser. No. 893,898, Apr. 6, 1978.

[30] Foreign Application Priority Data

Apr. 29, 1977 [CH] Switzerland ............... 5351/77

[51] Int. Cl.³ ............................................. B23K 9/00
[52] U.S. Cl. ............................ 219/121 P; 422/129;
250/527; 250/542; 13/9 R; 13/2 P; 13/10;
423/592
[58] Field of Search ............ 219/121 P, 121 R, ;
423/592; 422/198, 186, 129, 92; 13/5, 9, 10, 2 P;
250/542, 527, 547; 204/542

[56] References Cited

U.S. PATENT DOCUMENTS

| 3,247,014 | 5/1966 | Goldberger et al. | 250/547 |
| 3,658,673 | 4/1972 | Kugler et al. | 250/542 |
| 3,725,526 | 4/1973 | Pieri et al. | 423/592 |
| 3,749,803 | 7/1973 | Camacho | 13/1 |
| 3,779,182 | 12/1973 | Camacho | 219/121 P |
| 3,830,950 | 8/1974 | Schoumaker et al. | 219/121 P |
| 4,006,284 | 2/1977 | Segsworth et al. | 13/9 R |
| 4,071,588 | 1/1978 | Fey et al. | 250/542 |

Primary Examiner—B. A. Reynolds
Assistant Examiner—M. Paschall
Attorney, Agent, or Firm—Robert H. Bachman

[57] ABSTRACT

A high temperature reactor is fitted with a plasma gun at an anode chamber and is provided with a graphite cathode. The reactor is cooled by means of pipes in the refractory lining of the reactor, and rests on essentially horizontal bearings. The charge to be melted e.g. oxides or oxide mixtures is fed from above at an angle α at most 90° to the main axis of the reactor in the direction of the plasma stream, and the molten product is tapped off at an exit port which is also close to the entry port of the plasma stream so that the plasma stream covers and therefore heats the area around the exit port.

9 Claims, 3 Drawing Figures

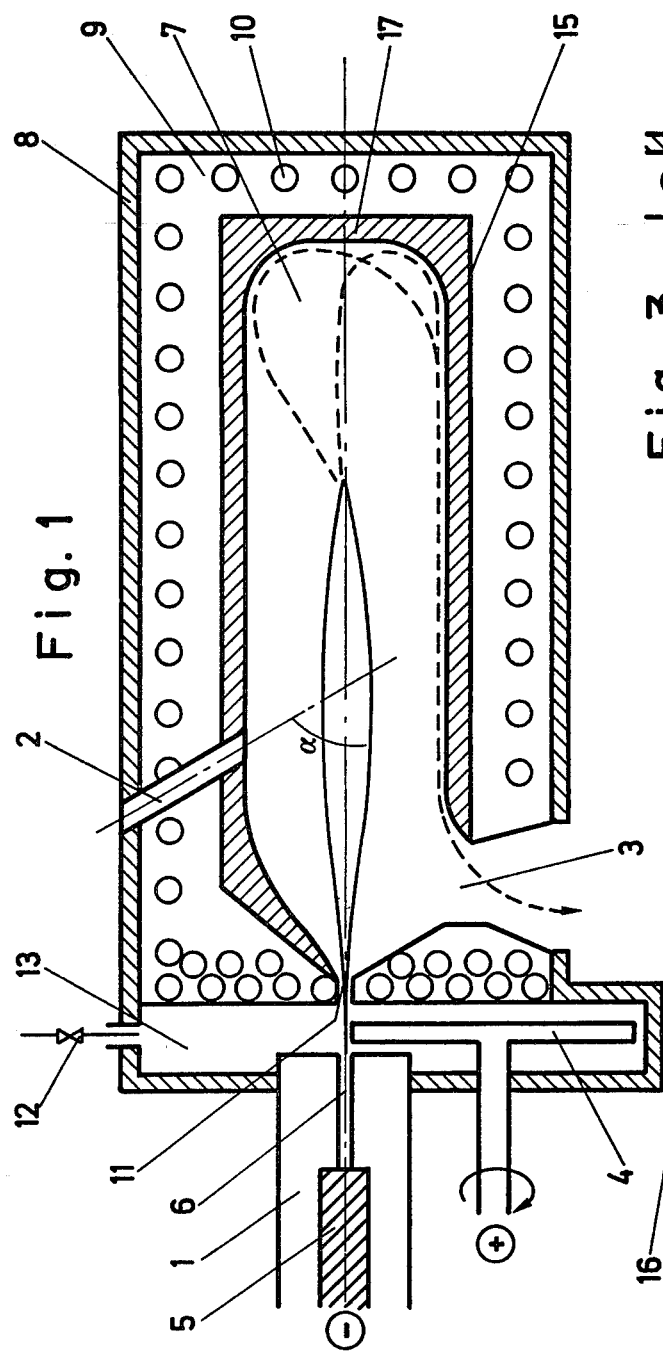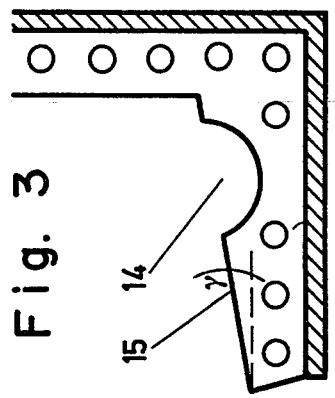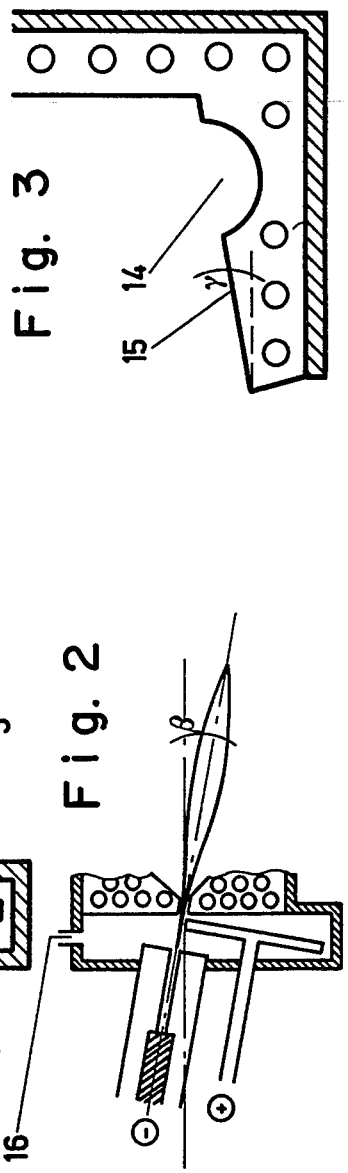

PROCESS FOR MELTING MATERIAL

This is a division of application Ser. No. 893,898, filed Apr. 6, 1978.

The invention concerns a continuously producing high temperature reactor unit and a process for its operation, in particular for continuously melting high melting point inorganic compounds, especially oxides and silicates.

There are already a number of devices and processes for melting oxides and oxide mixtures in high temperature reactor units with a view for example to homogenising mixtures, carrying out high temperature reactions such as decomposition processes, or manufacturing powder-like substances with directionally solidified grain structure (whiskers) for grinding or polishing applications. This involves the charge being melted in a suitable reactor unit by means of a plasma gun which can be gas stabilised or liquid stabilised. The product is a melt which is run out of the reactor and cooled in a suitable manner outside the unit.

These process steps can be carried out using rotating reactors in which the molten charge is spread over the inner wall as a result of centrifugal forces. Normally, since a continuous process presents considerable technical difficulties to a rotating reactor unit, such reactors usually operate by batch production. It is clear therefore that large scale manufacture of a product which involves melting in a plasma heated reactor as one of its steps, requires large investments. Another disadvantage which limits the suitability of such reactors in practice is the severe mechanical and thermal load on the bearings. As a result these bearings need frequent maintainance and therefore considerably increase production costs. With this in mind the inventor set himself the task of developing a process and device which permit materials to be melted continuously in a plasma-heated reactor with low production costs, whereby if desired, endothermic reactions such as decomposition processes can be carried out with the charge in the molten state.

This object is fulfilled by way of the invention in the form of a high temperature reactor unit which rests on essentially horizontal bearings and comprises a plasma gun connected to an anode space and having one rotating anode and one graphite anode, a reactor which is cooled and is lined with a refractory material on the inside, and where the said reactor is provided with an inlet opening (for introducing the charge to be melted) at an angle $\alpha$ of at most 90° to the main axis of the reactor and inclined in the direction of the plasma stream, and an outlet opening which is positioned so close to the point of entry of the plasma stream that it is covered by the plasma stream.

The process for operating the high temperature reactor of the invention is such that the material to be melted is fed in powder form from above at an angle $\alpha$ of at most 90° to the main axis of the reactor into a reactor which rests on basically horizontal bearings, where the stream of charge material is led at an angle $\beta$ of at most 90° to the plasma stream into the desired temperature zone of the plasma stream and melted there, as a result of which the molten particles are thrown against the reactor wall where the melt trickles down to the bottom of the reactor where it collects and is led off continuously through an exit port.

Surprisingly, it was found that the optimum reactor volume and the ideal shape of the reaction space form by themselves by the melt solidifying on the reactor wall during the starting up phase. The device of the invention can therefore be operated over a wide range of production capacities without need of changes in the equipment. The optimum interior volume and the shape of the reaction space are controlled mainly by the gun power, rate of powder feed and the cooling intensity.

Advantage is made of this in that on starting up the equipment, the resultant product is rejected at the start e.g. for about an hour, as it is contaminated anyway by furnace lining material dissolved in it.

By positioning the exit port near the plasma stream the outflowing molten material is kept at temperature which prevents solidifying material from blocking the exit port.

It has been found advantageous, in particular when processing temperature-sensitive substances, to design the floor of the reactor such that it is inclined towards the exit port, in order to make it easier for the melt to run off.

The blocking of the exit port by solidifying material can also be countered by positioning the entry port of the plasma stream below the main axis of the reactor. The exit port thus lies immediately in the region of heating by the plasma flame, which prevents the exit port being blocked by the solidifying melt. The entry port of the plasma stream is preferably positioned approximately in the middle of the zone main axis-reactor floor and the exit port below the first quarter of the plasma beam i.e. the hottest zone of the flame.

In general an effort is made to keep the delay time of the material in the reactor short in order to reach high throughput rates and, as mentioned above, to process temperature-sensitive materials as efficiently as possible. For certain applications e.g. in the thermal decomposition of silicates, it can however be desireable to maintain a minimum reaction time. This can be achieved by providing a recess in the reaction floor where the molten charge collects and, only after this recess has been filled, leaves through the exit port. The size of this recess can serve as a parameter to control the delay time of the product in the reactor. To counter the danger of partial solidification of the melt in this recess, the plasma gun can be made to tilt a few degrees towards the main axis and directed towards the recess acting as the melt reservoir.

The same effect can be achieved by designing the reactor floor such that it always rises towards the exit port. In a further advantageous version of the high temperature reactor of the invention the reactor is made tiltable by raising the gun and fixing it in the tilted position during operation, whereby the main axis of the reactor can preferably make an angle of up to 45° to the horizontal.

A porous, high temperature material made of hollow spheres and a suitable binder e.g. hollow spheres of corundum and a phosphate based binder has been shown to be a suitable material for the refractory lining of the reactor.

In a further advantageous version of the high temperature reactor of the invention water cooling is provided by means of pipes, for example copper pipes, embedded in the insulation material around the reactor.

Normal plasma guns can be used for the process of the invention. The manner of stabilising—liquid or gas—depends solely on the desired gun capacity. It has been found therefore that, for a capacity of up to 50 kW gas stabilised guns are of advantage, and for capacities of 50 kW and more the liquid stabilised gun is preferable. Water stabilised plasma guns are used preferably when processing materials which do not react with the easily oxidising plasma gas produced by such guns. Materials of this kind are, in particular, oxides and products which are thermally decomposed to the oxide form, such as e.g. silicates.

After the start up time, temperature equilibrium is established between the plasma flame and the surface of the reactor lining i.e. the shape and volume of the reactor space reach their optimum form by lining the reactor with solidified melt; this condition then remains essentially constant throughout the time the unit is in operation. In the case of a preferred shape of reactor, the extreme end of the flame reaches the entry port on the facing reactor wall and the ratio of reaction space length to height or diameter lies between 1:1 to 5:1. The process and device of the invention have been found to be favourable in particular for the melting of oxides and oxide mixtures which melt above 1700° C. It has also been found that the process and device of the invention are advantageous in the melting and thermal decomposition of silicates of the type for example MeSiO$_4$ according to the equation $$MeSiO_4 \xrightarrow{\Delta T} MeO_2 + SiO_2.$$

For certain applications, in particular for high temperature reactions, it has been found necessary to carry out the reactions in specified atmospheres. This requirement is met in an advantageous version of the device of the invention in that the plasma gun is connected via an air tight seal to the burner space and the desired gaseous atmosphere is introduced into the anode space for example via one or more valves, and from there led into the reaction space with the plasma stream.

The properties of the material treated in accordance with the invention can be varied over a wide range by means of choosing suitable cooling conditions. This might involve for example the grain size, which can be selected within a wide range by appropriate cooling conditions. As the melt is tapped off continuously, so also can continuous cooling methods be taken into consideration.

The invention will now be explained in greater detail with the help of three examples and a drawing.

The drawing shows, schematically, a section through an exemplified embodiment of the high temperature reactor of the invention which consists of a plasma gun and a reactor chamber.

The plasma gun 1 comprises a rotating anode 4 made of copper for example, and a graphite cathode 5. The flame in channel 6 is stabilised by means of a water vortex. The reactor 7 comprises a sheet steel outer shell 8, lined with a compressed refractory mass 9. Water cooled pipes 10, which are reinforced and are in duplicate at the flame entry port 11 and the exit port 3, are provided to cool the lining 9. A chosen gas atmosphere can be provided in the anode space 13 and in the reactor 7 by passing gases through a valve 12 and by having the plasma gun 1, fitted to the end face of the anode space 13 by means of an air-tight seal. The powder to be melted is added through the powder feed opening 2. The flow paths of the melt are indicated schematically by arrows.

The re-solidified layer of material formed during the starting up phase is indicated by 17. A specific gas atmosphere can be introduced into the reactor 7 via pipe 16.

Another version of the reactor with tiltable plasma gun 1 is indicated by A, and another version of the reactor with a recess 14 in the reactor floor 15 is indicated by B.

EXAMPLE 1

Aluminum oxide was melted continuously using a water-stabilised plasma stream and a reactor of approx. 6000 cm$^3$ internal volume, water-cooled via copper pipes. The reactor floor was designed with an incline of 6° towards the exit port. The power of the gun was maintained within the 130–150 kW range by progressive movement of the graphite cathode. At a throughput rate of 40 to 50 kg Al$_2$O$_3$/h, the aluminum oxide had a delay time of 10 to 14 seconds in the reactor. The melt running out of the reactor was cast into a mould which had the internal dimensions of 6×12×5 cm.

EXAMPLE 2

Aluminum oxide containing 21% zirconium oxide was melted in the same reactor using the same plasma gun as in the first example. The gun parameters chosen were similar to those in the first example; the reactor itself however, was inclined in such a way by tilting up the gun so that it made an angle of 10° to the horizontal. The reactor also had a flat floor. Under these conditions the delay time of the oxide mixture in the reactor was 45 to 55 seconds. The throughput of the Al$_2$O$_3$/ZrO$_2$ mixture was 45–50 kg/h.

Samples of the melt running off were taken and examined ceramographically and also with respect to their grinding properties. It was possible to maintain the properties of the Al$_2$O$_3$/ZrO$_2$ "alloy" produced this way constant over a production period of five hours.

EXAMPLE 3

The same reactor as was used in the second example was fed with zirconium sand (ZrSiO$_4$) at a rate of 50–55 kg/h and the same operating parameters employed as in the first example. The thermal decomposition of this silicate in the reactor proceeded in accordance with the equation $$ZrSiO_4 \xrightarrow{\Delta T} ZrO_2 + SiO_2$$

The delay time of the molten charge in the reactor was estimated to be 40 to 45 seconds. As a result of this relatively long delay time a 100% conversion was achieved. After cooling an easily ground product of monoclinic ZrO$_2$ embedded in amorphous SiO$_2$ was obtained.

What we claim is:

1. A process for melting material in powder form comprising: providing a horizontally disposed reactor having a reactor floor, a horizontally disposed main axis relative to said floor, a vertically disposed reactor wall relative to said floor extending from said floor, and an exit port in the floor; feeding the material into said reactor downwardly at an angle of at most 90° with respect to the main axis of the reactor; directing a plasma stream into the reactor via an inlet port and on to the material being fed into the reactor at an angle of at most 90° with respect to the feed direction of the material, whereupon the material is melted, is thrown against the reactor wall and flows on the floor of the reactor towards said exit; and tapping the melt from the reactor via the exit port, wherein the outflowing melt is maintained at a sufficiently high temperature to prevent solidification by positioning the exit port adjacent the plasma stream inlet port.

2. A process according to claim 1 wherein the material is continuously fed into the reactor chamber and the melt is continuously tapped from the reactor chamber exit port.

3. A process according to claim 1 wherein said reactor includes an anode chamber communicating with said reactor chamber, and wherein a specific atmosphere is maintained in the reactor chamber by introducing at least one gas into the anode chamber via a valve means during the operation of the reactor.

4. A process according to claim 1 wherein a water stabilized plasma gun is employed.

5. A process according to claim 1 wherein said material is an oxide or oxide mixture.

6. A process according to claim 5 wherein said oxide or oxide mixture has a melting point of at least 1700° C.

7. A process according to claim 1 wherein the floor of the reactor chamber is inclined towards said exit port.

8. A process according to claim 1 including an anode chamber communicating with said reactor chamber through an inlet port, wherein said plasma stream is directed through said inlet port from a plasma gun having a graphite cathode fitted on to the anode chamber.

9. A process according to claim 8 wherein said reactor chamber is lined with refractory material and overlying cooling means.

* * * * *